A. E. PETERS.
SPRING COVER.
APPLICATION FILED MAY 13, 1913.
1,080,652.
Patented Dec. 9, 1913.
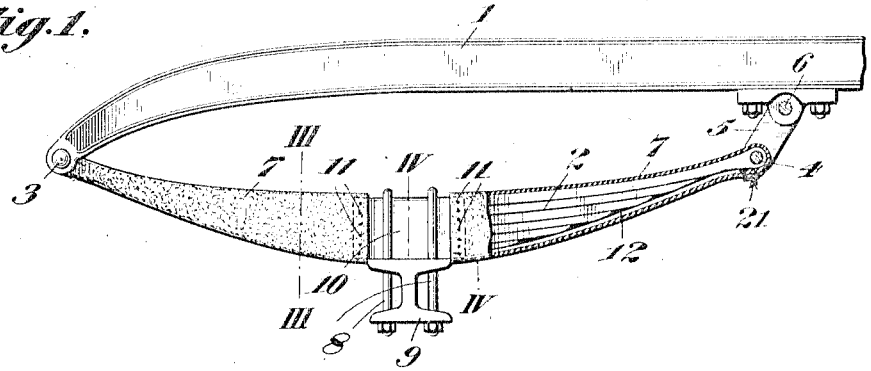
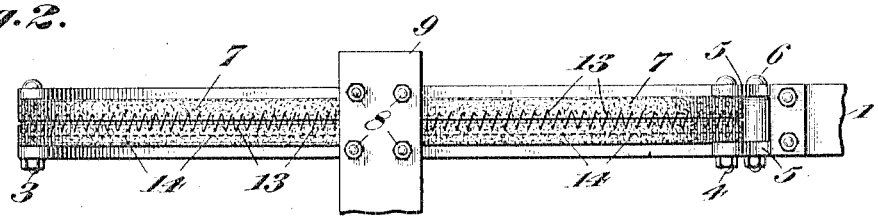
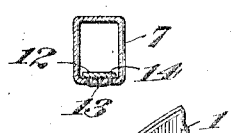
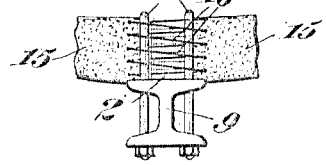
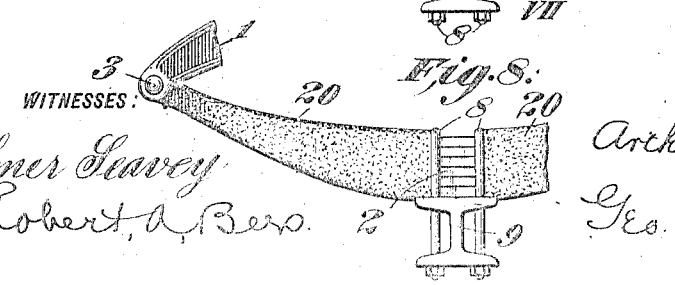
WITNESSES:
Elmer Seavey
Robert A. Bero
INVENTOR
Arthur E. Peters
BY
Geo. E. Thackray
ATTORNEY

UNITED STATES PATENT OFFICE.

ARTHUR E. PETERS, OF WESTMONT BOROUGH, PENNSYLVANIA.

SPRING-COVER.

1,080,652.   Specification of Letters Patent.   Patented Dec. 9, 1913.

Application filed May 13, 1913. Serial No. 767,246.

*To all whom it may concern:*

Be it known that I, ARTHUR E. PETERS, a citizen of the United States, residing in the borough of Westmont, in the county of Cambria and State of Pennsylvania, have invented certain new and useful Improvements in Spring-Covers; and I do hereby declare the following to be a full, clear, and exact description of the invention, such as will enable others skilled in the art to which it appertains to make and use the same.

My invention relates to spring covers for use in connection with vehicles such as automobiles, wagons, carriages, etc., and is adapted to form a flexible inclosure and clamp for leaf springs of any form, whereby they are protected from dust, mud, water, or other extraneous materials which would have a prejudicial effect upon them, and the cover is also adapted to retain lubricants within and between the portions of the spring which slide or move on one another.

Another object of my invention is to provide a cover of flexible material which will not interfere with the necessary spring action or resiliency of the spring, but at the same time, will, by reason of the tightness of its fit around the spring, tend to hold the individual portions of the leaves thereof together and prevent them from becoming separated in any direction, due to their spring movements.

A vehicle spring which is subjected to shock, due to passing over roughnesses or inequalities in the road or track, has a violent motion, first in one direction and then in the other, so that, under certain circumstances, the leaves may be opened or separated and then suddenly closed, producing an impact between the portions, which is sometimes destructive. The different portions of the spring after being bound together by means of my cover, will act, to a certain extent, as a unit and prevent such impacts, while at the same time, the flexibility of the cover will not lessen the resiliency of the spring.

Having thus given a general description of my invention, I will now refer to the various figures of the drawings attached hereto and forming part hereof, and on which like characters indicate like parts.

Figure 1 is a side elevation of a half elliptic spring of the style used on automobiles or similar vehicles; Fig. 2 is a bottom plan thereof; Fig. 3 is a transverse vertical cross section through the cover, after it is removed from the spring, on the line III—III of Fig. 1 and Fig. 4 is a cross section through the intermediate portion of the spring cover shown in Figs. 1 and 2, taken on the line IV—IV of Fig. 1, when removed from the spring. Fig. 5 shows another form of connecting the intermediate portions of my spring covers together. Fig. 6 shows another form of my spring cover made in two portions, each of which is provided with a stiffening rib to prevent undue distortion, longitudinal movement, or creeping; and Fig. 7 is a cross section of the same applied to the spring, taken on the line VII—VII of Fig. 6. Fig. 8 is a side elevation of a part of an elliptic spring provided with another form of my spring cover which is made in two portions so that this style and that shown in Figs. 6 and 7 can be put in place or taken off, without tools, by any one, and without the necessity of removing the spring clamp; the covers in this case, extending only to said central spring clamps.

Referring now to the numbers of reference on the drawings:—1 indicates a portion of the frame of an automobile or other vehicle, 2 is a leaf spring shown in this case as of semi-elliptic form, but I wish it understood that my cover can be applied to springs of other shapes, as will be readily understood; 3 represents the spring pin or pivot at one end thereof; 4 the pivot at the other end; 5 represents a link pivoted at one end at 4 and the other end at 6, the latter pivot being attached to the frame of the vehicle, the link being adapted as customary, to allow the movement of the spring.

7 represents my spring cover which may be made of leather, duck, japanned duck or leather, or in fact, any strong, and at the same time, somewhat flexible material which is formed, preferably slightly smaller than the spring, so as to fit tightly when the edges are drawn together forcibly by the lacing or other fastenings. The spring clamps which are, in this case, shown as U-bolts, are indicated at 8, by means of which the spring is secured to the axle 9, shown as of I-beam construction.

As shown in Figs. 1 and 4, the central portion of my spring cover, indicated as 10, is preferably composed of metal such as iron, steel, aluminum, brass, bronze, etc., and is adapted to closely fit and conform to the central portion of the top and sides of the spring and form a solid, and at the same time, a secure seating for the spring clamps 8. By means of this construction the spring is firmly and solidly secured to the axle 9 as the metallic portion 10 is practically unyielding and will permit the clamps 8 to be screwed up tightly, thereby firmly securing the spring in position on the axle 9.

As shown in Fig. 1, the central portion 10 of my spring cover is secured to the other portions 7 by means of rivets or bolts 11 that are passed through registering holes in said portions, or holes may be provided and the construction laced together, or in fact secured together in any practical manner. The central portion 10 of my spring cover serves to connect the two end portions and hold them firmly in position without possibility of their creeping endwise or otherwise.

The portions 7 of my spring cover are provided with lacing holes 14 which may be also provided with reinforcing eyelets, hooks or pins, through, or around, which the lace 13 is passed and drawn up tightly and secured, these holes and lacing being arranged on the lower side of the spring and normally out of sight, so that the cover presents a neat and smooth appearance, and is easily cleaned from dust, etc.

The edges of my spring cover 7 are so proportioned as to stand apart a slight distance to allow the cover to be drawn up tightly, and in order to cover this opening and prevent access of extraneous materials to the spring, I provide a tongue 12, preferably secured on the inside of the spring cover and riveted or sewed thereto as indicated in Fig. 3.

As shown at 21, in Fig. 1, I may form the upper portion of my spring cover with an end tongue which projects over the end of the spring and is tucked into the end opening and laced to the lower part of said spring cover as shown, thereby closing the end opening, the whole thus forming a tight and complete casing.

As shown in Fig. 5, the end portions of my spring cover are indicated as 15, which, in this case, extend substantially up to the spring clamps 8 which rest directly against the leaf spring 2, the ends of said cover 15 being laced firmly together by means of the lacing 16. This spring cover shown in Fig. 5 is adapted to be placed in position by the owner or any one, without the use of tools, or without disassembling the spring from position, and one of my ideas in lacing it together as shown, is to prevent the cover from wrinkling or creeping endwise, or otherwise becoming loose or displaced.

Referring now to Figs. 6 and 7, the end portions of my spring cover are therein indicated as 17, and are provided with a reinforcing strip 18 extending longitudinally thereof and preferably on the inside of the upper portion. This reinforcing strip may be made of a flat bar of iron, steel or other metal, or may be composed of a piece of raw-hide, sole-leather, hardwood, or other substance cemented to, or secured to the cover by rivets 19 as shown. This style of cover is particularly adapted to be applied by any one without the necessity for loosening the spring clamps and by reason of the stiffening member 18 in connection with the other portions, end creeping or displacement of the spring cover is prevented. This spring cover is also provided with lacing holes, laces, etc., as illustrated in Fig. 2.

As shown in Fig. 8, my spring cover is indicated as 20 and in this case it is preferably formed of a comparatively stiff, but flexible material, such as heavy leather, sole-leather, or similar substance of character such that when laced tightly on the spring as heretofore indicated, it will not climb or creep by reason of said stiffness.

By means of the construction described my cover is firmly secured laterally to the spring by the bottom lacing 13 and is firmly secured longitudinally by the central lacing 16, or by the central metallic portion 10, thereby firmly binding the spring leaves together and preventing the cover from moving endwise, which it would otherwise do on account of the tapered form of the spring and its motion when in use. By means of the construction shown in Figs. 6 and 7 the reinforcing strip 18 prevents the endwise movement or creeping of the cover. I may also secure my cover by means of snap fasteners or placket fasteners such as are used on plackets, gloves, etc.

In order to lubricate the spring and the space between the cover and the spring, I may introduce the lubricant from a grease gun, or an oiler, by inserting the extremity of the tube of same into the opening between the end tongue and the lower part of the cover as indicated at 21 in Fig. 1, and by rubbing said cover toward the center of the spring said lubricant is spread. I may also have a spring cap oil or grease opening near the end of the cover through which to introduce said lubricant.

Although I have shown and described my improvements in considerable detail, I do not wish to be limited to the exact and specific details shown and described, and I may make my spring cover end portions of metal or combination of metal and other material, such as leather, duck, etc., and may use such substitutions, modifications or equivalents thereof, as are embraced within the scope of my invention or as pointed out in the claims.

Having thus described my invention, what I claim and desire to secure by Letters Patent is:

1. A spring cover composed of flexible material adapted to closely inclose a leaf spring and provided with means for laterally and separate means for longitudinally securing the same in position.

2. A spring cover composed of flexible material adapted to closely inclose the end portions of a leaf spring, means for laterally securing the same thereon, and a comparatively inflexible central portion secured to said end portions.

3. A spring cover composed of flexible material adapted to closely inclose a leaf spring, and a stiffener secured to said cover and extending longitudinally of said spring adapted to prevent creeping or longitudinal movement of said cover.

4. A spring cover composed of end portions of flexible material adapted to closely fit the projecting resilient ends of a leaf spring, means for securing same laterally, and a stiff metallic portion adapted to fit the central portion of said spring and secured to said end portions, whereby said cover is retained in position laterally and longitudinally.

5. A spring cover composed of flexible material adapted to closely fit the projecting resilient part of a leaf spring, lacing holes in the adjoining edges of said material, a lace passed through said holes adapted to secure the same laterally, and a stiffening member secured to said flexible material and extending longitudinally of said spring.

6. In a spring cover of the character described, an end portion of flexible material adapted to closely fit the projecting resilient part of a leaf spring, the edges of said material being laterally secured together on the lower side thereof, a tongue secured to one of said edges and adapted to cover the opening between said edges, a flap extending from the end of the upper part of said cover around the end of said spring and removably secured to the lower part of said cover.

7. A cover for half elliptic leaf springs comprising end portions of flexible material adapted to inclose the ends of said springs and extending from the central spring clamps to the spring extremities, the meeting edges of said cover being arranged at the lower surface of said spring, means for laterally securing said edges together, and means for longitudinally securing the adjoining central portions of said spring cover.

In testimony whereof I hereto affix my signature in the presence of two witnesses.

ARTHUR E. PETERS.

Witnesses:
 ELMER SEAVEY,
 E. M. DAWSON.